(12) United States Patent
Hansen et al.

(10) Patent No.: US 7,590,522 B2
(45) Date of Patent: Sep. 15, 2009

(54) VIRTUAL MASS STORAGE DEVICE FOR SERVER MANAGEMENT INFORMATION

(75) Inventors: Peter A. Hansen, Cypress, TX (US); Thomas D. Rhodes, Woodlands, TX (US); Andrew C. Cartes, Cypress, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

(21) Appl. No.: 10/867,524

(22) Filed: Jun. 14, 2004

(65) Prior Publication Data

US 2005/0276092 A1    Dec. 15, 2005

(51) Int. Cl.
 *G06F 9/455* (2006.01)
(52) U.S. Cl. ............................ 703/24; 710/15; 711/104
(58) Field of Classification Search ............... 700/27; 709/222, 223; 395/502; 703/24; 710/15, 710/72, 260; 711/114; 345/502, 700; 439/502; 455/575.1
See application file for complete search history.

(56) References Cited

U.S. PATENT DOCUMENTS

| | | | |
|---|---|---|---|
| 5,241,680 A * | 8/1993 | Cole et al. .................. 713/322 |
| 5,878,248 A * | 3/1999 | Tehranian et al. ............ 345/502 |
| 6,167,538 A | 12/2000 | Neufeld et al. ................. 714/47 |
| 6,553,336 B1 * | 4/2003 | Johnson et al. ............. 702/188 |
| 6,934,784 B2 * | 8/2005 | Chheda et al. .............. 710/260 |
| 2002/0069318 A1 * | 6/2002 | Chow et al. ................. 711/104 |
| 2003/0030656 A1 * | 2/2003 | Ang et al. .................... 345/700 |
| 2003/0191877 A1 * | 10/2003 | Zaudtke et al. ................. 710/72 |
| 2004/0078185 A1 * | 4/2004 | Briggs et al. ................... 703/24 |
| 2004/0078503 A1 * | 4/2004 | Zaudtke et al. ................. 710/72 |
| 2004/0128443 A1 * | 7/2004 | Kaneda et al. ............... 711/114 |
| 2004/0152357 A1 * | 8/2004 | Sivertsen ..................... 439/502 |
| 2004/0162893 A1 * | 8/2004 | Brown et al. ................ 709/222 |
| 2004/0166905 A1 * | 8/2004 | Cherniski et al. ......... 455/575.1 |
| 2005/0080956 A1 * | 4/2005 | Zaudtke et al. ................. 710/72 |
| 2005/0132095 A1 * | 6/2005 | Collins ........................ 710/15 |
| 2005/0268170 A1 * | 12/2005 | Kearney et al. ............... 714/32 |

* cited by examiner

*Primary Examiner*—Paul L Rodriguez
*Assistant Examiner*—Kandasamy Thangavelu (57) ABSTRACT

A method to communicate provide server management information that emulates a floppy disk drive (FDD) with a management processor. This management processor operably couples to a multi-function integrated circuit having a FDD controller. Monitoring hardware and sensors operably couple to the management processor and write server management information to data files within the emulated FDD. Programs that utilize the server management information may then read this server management information.

15 Claims, 5 Drawing Sheets

VIRTUAL MASS STORAGE DEVICE FOR SERVER MANAGEMENT INFORMATION

TECHNICAL FIELD OF THE INVENTION

The present invention relates generally to emulating a mass storage device, and more particularly, a system and method to export information from monitoring hardware and sensors without requiring or maintaining specific device drivers for the monitoring hardware and sensors.

BACKGROUND OF THE INVENTION

Computer networks such as LAN's (local area networks) have become one of the most important devices for storing and sharing data in business. Thus, computer networks have become one of the most critical pieces of equipment in a business office. A failure in the computer network can cause business operations to grind to a halt. Computer networks typically have numerous personal computers and other data processing devices connected together for information exchange. At the heart of the computer network are one or more file servers. In most computer networks, file servers administer and store the documents generated by each of the personal computers (PC's) in the system. In addition to managing the network, file servers also include the capability to monitor faults in themselves and the computer network. If a fault is detected, the file server provides a warning of the fault and in certain instances may also provide diagnostic operations, and may even implement corrective measures.

Servers are designed to provide client work stations with fast access to files and applications stored by the server. Accordingly, file servers embody a computer which responds to an operating system program (a popular operating system being, for example, WINDOWS®, or LINUX®) to not only orchestrate the files but also to maintain file security, file backup, or other file management features. Recently there has been a steady increase in the number of servers that are used in businesses. The trend places one or more servers at each location of a business, rather than using a single main frame computer at a centralized location. Typically, a company has an individual or department responsible for administering all of the file servers. In many instances, the administrator or administration department is headquartered at one site. Thus, each of the servers must be maintained and monitored remotely.

Monitoring may involve gathering and interpreting management, health and performance information about individual computer systems and file servers. Numerous monitoring systems are available to automatically alert designated persons when a computer system, file server or software application has failed. When such a failure occurs, the persons being notified may be in a remote location and not able to directly access the failed PC.

Products such as Compaq Server Manager® and Compaq Insight Manager®, have attempted to address some of the issues involved in managing distributed servers. These products permit an administrator to access certain information provided on the server. Compaq's Insight Manager® permits local and remote notification of errors. Insight Manager® also collects and monitors server data as well as data from each client in the network and allows the network manager to act on the data.

It is certainly beneficial to monitor certain server functions. Downtime caused by server failure may be the most costly expense incurred in running a distributed computer system. The causes of server failure or "crash" are numerous. Any number of malfunctions or design flaws associated with the server hardware, server operating system or application programs running on a server may cause a server to crash. If a server crashes, then file access is often lost and business records are temporarily inaccessible until the cause of failure is fixed.

Typically monitoring is achieved by interfacing monitoring hardware and sensors that gather management, health, and performance information on the computer system, with the operating system. To interface the monitoring hardware and sensors, users install and maintain complex drivers and programs to gather and interpret the management, health, and performance information. The burden of maintaining these drivers to support the monitoring hardware and sensors is often significant. In fact, this burden can be so great that users often choose not to install these management/monitoring functions in order to avoid this burden.

Additionally, companies often develop special proprietary drivers as part of management packages that gather and interpret management, health, and performance information from the monitoring hardware and sensors. These drivers require ongoing support to ensure proper operation with new hardware platforms and operating systems. Additionally, "open source" operating systems, such as LINUX, require that the source code associated with drivers operating within the "open source" operating system be freely available and "open source" themselves. As companies have often spent significant resources developing the management hardware and software drivers to support the management hardware, the companies do not typically want to freely provide this proprietary source code.

SUMMARY OF THE INVENTION

The present invention provides a virtual mass storage device (MSD) such as but not limited to a floppy disk drive (FDD) from which server management information can be exported. More specifically, an emulated MSD is provided and allows access to server management, health and performance information. The emulated MSD is modeled within a baseboard management controller (BMC) or other like controller. Firmware within the BMC represents the emulated MSD. A multi-function integrated circuit such as the super IO controller operably couples to the BMC. This multi-function integrated circuit has an MSD interface capable of operably coupling to the BMC and an MSD controller. Monitoring hardware gathers health or other management information associated with the operation and performance of the computing device and writes this information to the emulated MSD.

BRIEF DESCRIPTION OF THE DRAWINGS

For a more complete understanding of the present invention and the advantages thereof, reference is now made to the following description of embodiments of the invention taken in conjunction with the accompanying drawings in which like reference numerals indicate like features and wherein.

DETAILED DESCRIPTION OF THE INVENTION

Embodiments of the present invention are illustrated in the FIGURES, like numerals being used to refer to like and corresponding parts of the various drawings.

Certain terms are used throughout the description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical, mechanical, or optical connection. Thus, if a first device couples to a second device, that connection may be through a direct electrical, mechanical, or optical connection, or through an indirect electrical, mechanical, or optical connection via other devices and connections. The term "computer" is used in this specification broadly and includes a personal computer, workstation, file server, or other microprocessor-based device, which can be programmed by a user to perform one or more functions and/or operations.

Figure 1:
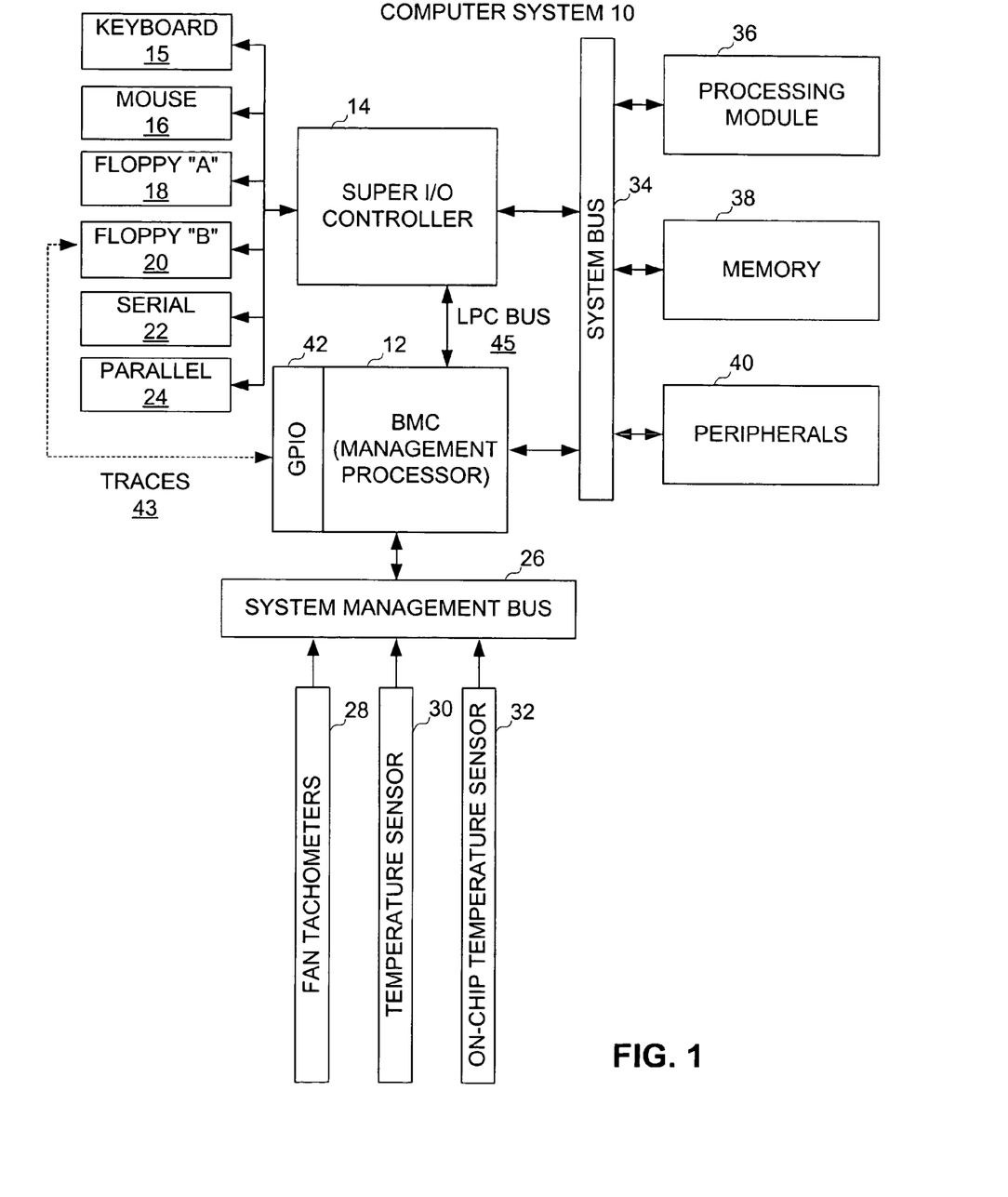
FIG. 1 provides an architectural overview of computing system that embodies the invention.

It has now been discovered a need exists within "open source" operating systems, such as the LINUX operating system, for a system and method to export the management, health, and performance information without the need to create, maintain, or disclose complex software drivers. Addressing this need may avoid a source of user dissatisfaction and frustration associated with supporting health or management systems. FIG. 1 provides an architectural overview of the computing system 10 that embodies the invention and includes functional blocks and their electrical relationships. Computer system 10 may perform the role of either a file server or client workstation. More specifically, FIG. 1 depicts baseboard management controller (BMC) 12 serving as the management processor; super IO controller 14, wherein super IO controller 14 further contains keyboard interface 15, mouse interface 16, floppy disk drive (FDD) "A" interface 18, FDD "B" interface 20, serial port interface 22 and parallel port interface 24; system bus 34; system management bus 26, wherein system management bus 26 may comprise low bandwidth bus and receives inputs from sensors 28, 30, and 32; processing module 36; memory 38; and peripherals 40. The super IO controller is a single chip that performs many functions that were previously performed by several pieces of hardware. The super IO controller typically controls the slower-speed standardized peripherals common to most personal computers. These functions include serial port control, parallel port control and FDD control.

Processing module 36 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 38 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 36 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Various peripheral devices 40 may include for example, digital video disk (DVD)—read only memory (ROM) drives, data drives using compression formats such as the ZIP format, and Personal Computer Memory Card International Association (PCMCIA) slots/drives. These peripheral devices may permit removable data storage media to be inserted in appropriate receptacles, where the data stored on the media may be read by circuitry. Various peripheral devices are available in the industry, including keyboards, monitors, mice, printer, and speakers, among others. In addition, as one skilled in the art will understand, various composite peripheral devices may connect, including devices that combine the features of conventional items, such as printers/scanners/fax machines, and the like.

FIG. 1 generally illustrates the architecture of computer system 10. One should realize that many different architectures are possible without affecting the departing from the spirit of the present invention. For example, some architectures divide system bus 34 into two busses, the Northbridge and Southbridge. The Northbridge generally couples to memory and processing modules, while the Southbridge generally couples to peripherals. Various system bus compliant devices may connect to the system bus 34. Through system bus 34, the processing module 36 can communicate with various system devices, including, but not limited, to the peripheral devices 40 connected to the system bus 34. In accordance with the protocol of system bus 34, such as the peripheral component interconnect (PCI) bus protocol, various devices may read data from and write data to memory 38.

File servers administer and store documents generated by individual client workstations (personal computers) linked to the file server. In addition to managing the network, file servers also include the ability to monitor faults within themselves and the computer network. Such monitoring includes management, health and performance information. If for example a fault is detected, the file server may provide a warning of the fault, and in certain instances, provide diagnostic operations and even implement corrective measures. These faults are often detected by on-board sensors such as but not limited to fan tachometer 28, temperature sensor 30, or on-chip temperature sensor 32. These sensors and other like sensors provide their outputs through system management bus 26 operably coupled to BMC 12. BMC 12 provides a single access point for hardware-based monitoring, test, diagnosis, and alarm management within computer system 10. Some baseboard management controllers also provide remote management functions for computer system 10 as well.

Previously, these sensors required special drivers associated with the operating system (OS) of computing system 10. However, by writing these sensor outputs directly to a readable data file within a virtual FDD, emulated by software or firmware executed within BMC 12, the need to create and maintain specialized OS drivers is eliminated. Most sensors utilize a simple mechanism to provide the data from the sensor to files within the virtual FDD or MSD. For example, the BMC may periodically poll the sensors for current data. Alternatively, the sensors may issue an interrupt to the BMC when a threshold is reached to report the threshold condition. Yet another solution reads the sensor on-demand, in real-time by the BMC when the MSD is accessed. Although no drivers are required at the OS level, BMC to sensor level drivers facilitate communication between the BMC and sensor. However, the BMC is inherently programmed to communicate with these sensor devices through the SMBUS protocol.

In one embodiment software instructions or firmware within BMC 12 emulates an FDD "B" drive. Although the emulated MSD is described as a FDD, the emulated MSD may include any memory devices known to those skilled in the art capable of interfacing with super IO controller 14 through a keyboard style interface, serial interface, parallel interface, FDD interface, integrated drive electronics (IDE) interface, PS/2 interface, mouse interface, timer chip interface, RTC interface, game controller interface, CMOS interface 8042, NVRAM interface, I2C interface, GPIO and other such interfaces as known to those skilled in the art. These MSDs include but are not limited to FDDs, Hard disk drives (HDDs), such as integrated drive electronics (IDE) or enhanced IDE (EIDE) HDDs, universal serial bus (USB) MSD, optical disk drives, and other such MSDs known to those skilled in the art. In this example an FDD was chosen as the emulated MSD since an FDD is a relatively slow device that can modeled with the BMC processor. However, as the capabilities of the BMC increase, other MSDs, such as but not limited to those described above, may be modeled with the BMC processor.

Every computer system 10, compatible with the X86 architecture, contains two FDD interfaces, FDD "A" interface 18 and FDD "B" interface 20, within its built-in FDD controller. Often, super IO controller 14 is integrated into a larger multi-function chip. These interfaces currently exist on all machines despite being many years since the second FDD or "B" drive had been widely used due to the obsolescence of the 2nd floppy disk with the availability of a HDD. Typically, the floppy "B" drive interface is not wired to anything. Should the interface be wired, this connection would create a "B:" drive within a Microsoft operating system or a "/dev/fd1" drive on most distributions of LINUX. When wired, the FDD interface plugs directly into the actual FDD that accepts discs from the user. This interface typically constitutes multiple traces 43 between the GPIO 42 and the MSD interface. For example, when the emulated MSD is a FDD, a 34-pin cable couples GPIO 42 to floppy "B" drive controller 20. This 34-pin cable carries a number of signals generated by the BMC that simulate a FDD, and the density select, drive select, and write protect inputs to the FDD interface that need not be generated by the BMC. The remaining 18 pins provide common grounding or are not connected. Because the FDD controller and corresponding FDD use slow signals, by contemporary standards, the drive interface can be emulated within BMC 12 by wiring FDD "B" interface 20 to GPIO pins 42 on BMC 12. This is shown in further detail in FIG. 2. Low pin count (LPC) bus 45 also interfaces super IO controller 14 and BMC 12. However, the emulated MSD is realized through the interface between the BMC GPIO pins and MSD interface. As the processing capabilities of the BMC or management processor increase, the BMC or management processor may emulate other MSDs such as but not limited to Hard disk drives (HDDs), such as integrated drive electronics (IDE) or enhanced IDE (EIDE) HDDs, universal serial bus (USB) MSD, optical disk drives, and other such MSDs known to those skilled in the art. In instances where these MSD interface to the system bus rather than the super IO controller, such as in the case of a USB device, the BMC may emulate the MSD and provide access to the emulated MSD though the connection between the BMC and system bus.

BMC 12 couples to the super IO controller to make the sensor outputs accessible, as a readable file. This allows any utility or program having access to the emulated FDD provided within BMC 12 to access the readable file. Firmware or software instructions executed within BMC 12 emulate a physical FDD by manipulating the 13 signals, which were introduced above. The emulated FDD "B" drive provides access to management, health, or performance information pertaining to the operation of computer system 10. This arrangement requires no special drivers as every operating system written for an IBM compatible architecture computer inherently has the ability to read and write to the emulated FDD without being able to distinguish the emulated FDD from a physical FDD. Information written to the emulated FDD may include but should not be limited to fan tachometer outputs, temperature sensor outputs, ECC memory errors, storage subsystem statistics, firmware revisions, unit ID LED (UID) information as well as other like inputs known to those skilled in the art. This management, health, and performance data may be written in any format.

Figure 2:
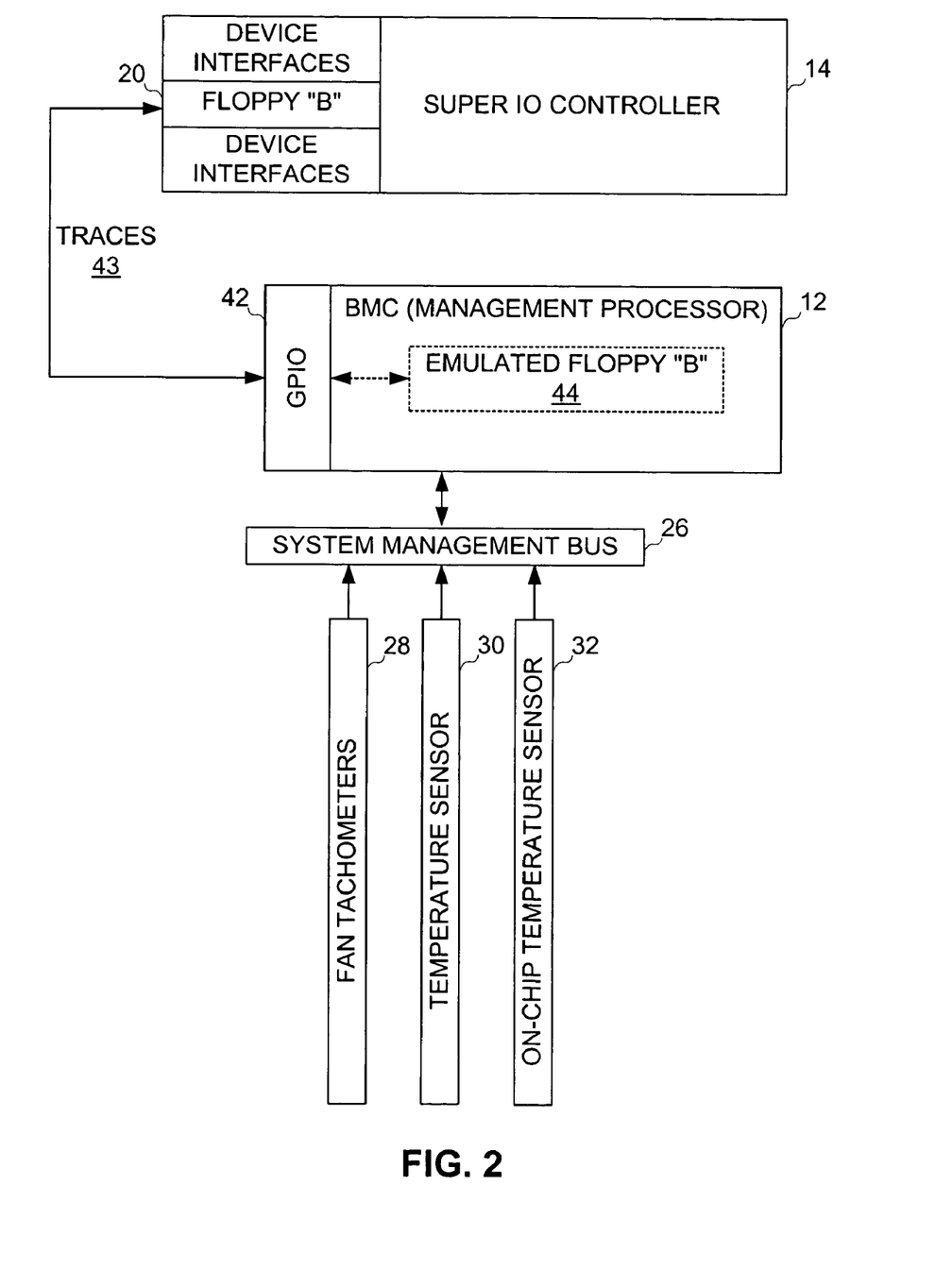
FIG. 2 depicts the relationship between the management processor and super IO controller when emulating a device or peripheral as an embodiment of the invention.

FIG. 2 describes in further detail the relationship between BMC 12 and super IO controller 14 in emulating an FDD. Here, an emulated FDD, such as emulated floppy "B" drive 44, is provided within BMC 12. Emulated floppy disk "B" drive provides 13 signals as outputs through GPIO 42. GPIO 42 operably couples to the FDD floppy "B" interface 20 associated with super IO controller 14. This allows sensor outputs that monitor the health and performance of computer system 10 to be provided to BMC 12 through system management bus 26. These inputs are written to data file(s) within the emulated FDD. This allows access to these sensor outputs without the need to install complex drivers or programs to interpret or format the raw information. Further, since the interface is inherent in the X86 architecture, there is minimal cost associated with activating this feature. Typically, the architecture of computer system 10 couples integrated circuits containing a FDD controller, such as super IO controller 14, to BMC 14. The virtual file allocation table (FAT) file system within emulated floppy "B" drive 44 is illustrated in FIG. 3.

Figure 3:
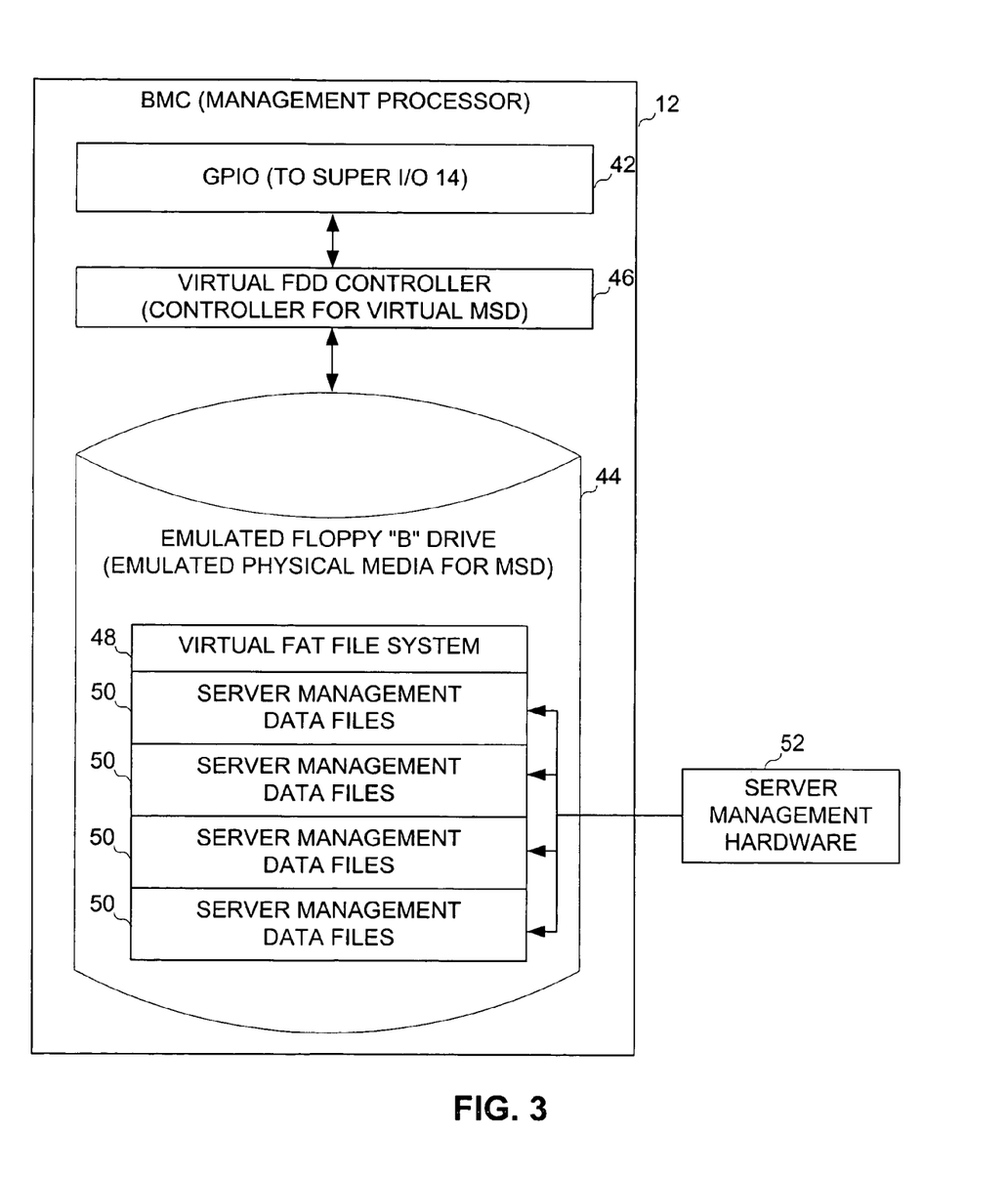
FIG. 3 functionally depicts the management processor and super IO controller while emulating a floppy "B" drive within an embodiment of the invention.

FIG. 3 functionally shows BMC 12, wherein virtual FDD controller 46 interfaces with emulated floppy "B" drive 44. FDD controller 46 emulates the electronics of the emulated MSD. Emulated floppy "B" drive 44 represents the physical media of the emulated MSD and utilizes a virtual FAT file system 48 having multiple server management data files 50 to which the above sensor information is written. These data files may utilize Extensible Markup Language (XML) or other like languages known to those skilled in the art to enable the definition, transmission, validation, and interpretation of data.

Figure 4:
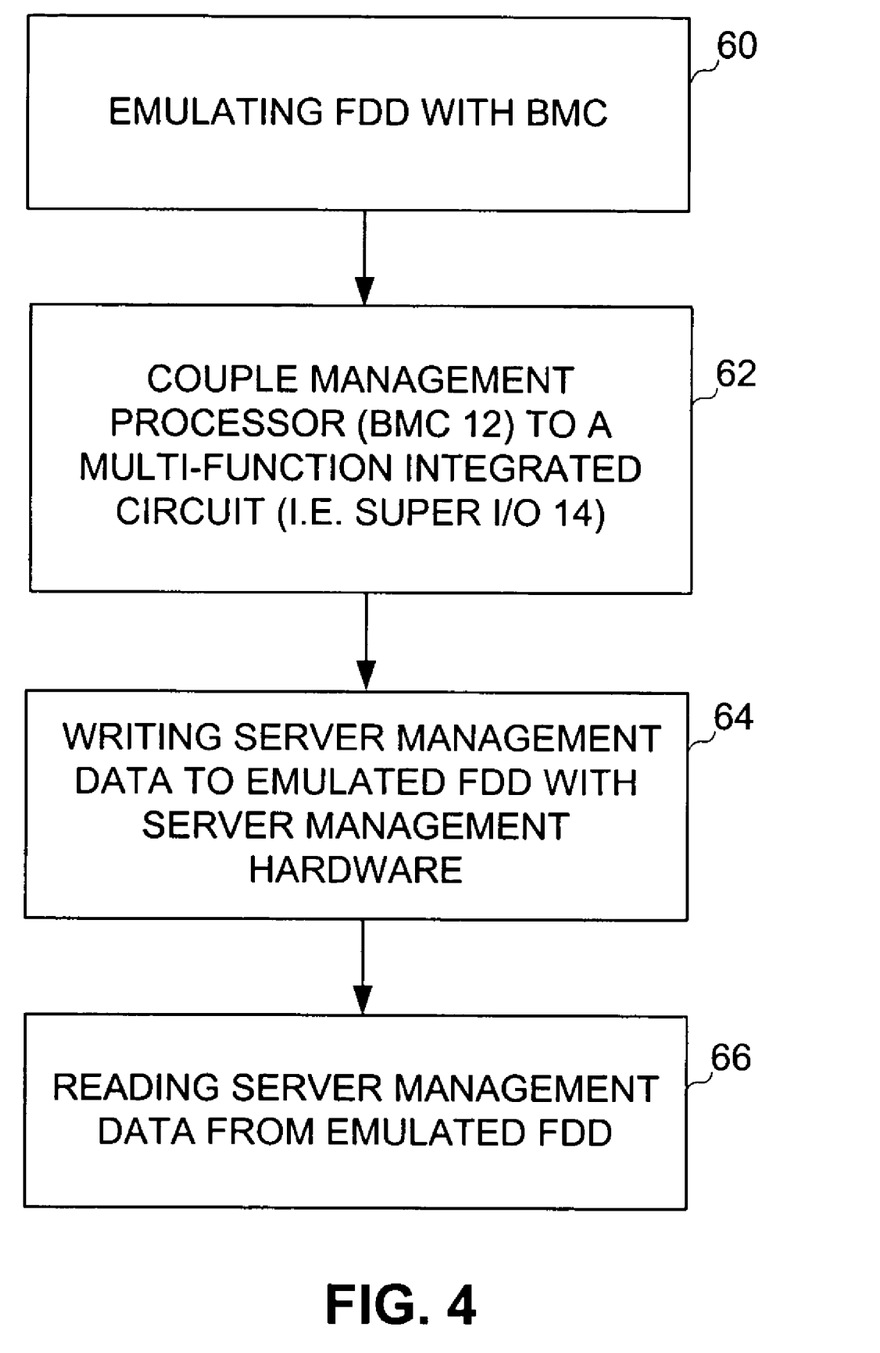
FIG. 4 is a logic flow diagram illustrating one embodiment of the present invention.

FIG. 4 is a logic flow diagram illustrating one embodiment. The logic flow diagram details a process by which access to server management information is provided. This begins with the emulation of an FDD with a device such as, but not limited, BMC 12 in step 60. This emulated FDD within the BMC operably couples to a multi-function integrated circuit such as super IO controller in step 62. Server management, health, or performance data is then written to files within the emulated FDD by server management hardware that includes sensors or other like devices in step 64. The sensors themselves may or may not write to the MSD. This depends on how complex the sensor is. Most sensors utilize a simple mechanism to write data from the sensor to the MSD. For example, these sensors monitor a given variable, such as temperature, with a temperature sensor. While such sensors read and monitor their respective environments, the sensor typically has an interrupt line that runs to the BMC and uses an interrupt when a programmable threshold is reached to report the threshold condition. To sample the sensor on-demand, the sensor may be read in real-time by the BMC when the MSD is accessed. Alternatively, the sensors can be polled by the BMC wherein the latest results of the poll cycle populate the MSD. Furthermore, the sensor is read whenever the sensor asserts an interrupt to signal a threshold exceeded. Although no drivers are required at the OS level, BMC to sensor level drivers are required to communicate between the BMC and sensor. However, the BMC is inherently programmed to communicate with these sensor devices through the SMBUS protocol.

Management, health, or performance information includes, but is not limited to, inputs from various sensors associated with the server. In step 66 server management, health, or performance information is read from the emulated FDD by programs or devices acting on such information.

This provides an advantage over prior solutions in that it is possible to access management, health, or performance information about the computing system without the burden of creating and supporting a driver to interface with the system management hardware or for new operating systems and hardware. Since the operating systems can read and write directly to the emulated FDD, both new and old operating systems can access the information. This accessibility comes from the fact that all existing operating systems have drivers for the floppy interface as well as the FAT file system. Since the floppy and FAT file system provide an emulated FDD, it no longer is necessary for a user to install complex drivers and programs to comprehend management, health, or performance information from or gathered by the management hardware.

As the FDD interface is inherent in the X86 architecture of IBM compatible computer systems, this feature only requires that the appropriate instructions, either in firmware or software, be written and executed within the management processor to generate the emulated signals for the virtual device or communication port. In one implementation, emulated FDD signals provide the virtual geometry of a FDD and virtual FAT file system. Furthermore, as the FDD controller typically has a standard 34-pin header, any off-the-shelf commodity X86 motherboard may be externally enabled with this ability by plugging an external management processor into the FDD controller connector on the board. Management, health, and performance information may thus be provided in a human readable format as files accessed within the emulated FDD. Further, this information is immediately available to users through the emulated FDD drive at first boot up of the computer system or within the windows pre-install environment. In fact, the computer system could be booted from the emulated FDD if needed. Similarly, as the FDD and FAT file system are accessible by all operating systems, 16-bit based entities, such a pre-boot execution environment (PXE) agents, can interface directly and easily with the emulated FDD for information about the server, without the need for special 16-bit drivers.

Prior management interface solutions required special drivers to interact with the hardware that collected management information. The present invention avoids the requirement that proprietary drivers be disclosed in an open source environment, such as LINUX. This avoids customer dissatisfaction and frustration while ensuring that management functions are supported within server platforms running LINUX or other "open source" operating systems. Thus, these implementations avoid issues associated with proprietary drivers and their maintenance.

In another embodiment, BMC 12 collects status data regarding the operation of the managed server and/or the local area network as stated above. However, an additional application executed within BMC 12 may function as a web server, such that it can communicate over an Internet, intranet or similar technology connection. The combined applications executed within the management processor may then display data reflecting the server operation and performance on a web page real-time. The management processor may also display historical and other measurement or configuration data. These measurements may then be accessed by simply entering the respective URL address for the web server within the management processor. In response to the selection of this address, the management processor is contacted and replies with its web page, which preferably includes a list of current server conditions populated from data files within the emulated FDD.

Another implementation allows a program on the server platform to communicate directly with an installed management processor through the super IO controller using IO port interfaces on super IO controller that couple to the BMC without requiring device drivers. Communications in this implementation may be used for both configuration messages and operations. Operations involve sending commands to the management processor or BMC. Communication to the management processor may, for example, be over a UART-style serial port interface although other IO interfaces may be possible. These interfaces include, but are not limited to, a keyboard (KCS) style interface, serial interface, parallel interface, FDD, IDE, PS/2, mouse, timer chip, RTC, game controller, CMOS interface 8042, NVRAM interface, I2C, GPIO and other such interfaces as known to those skilled in the art.

Figure 5:
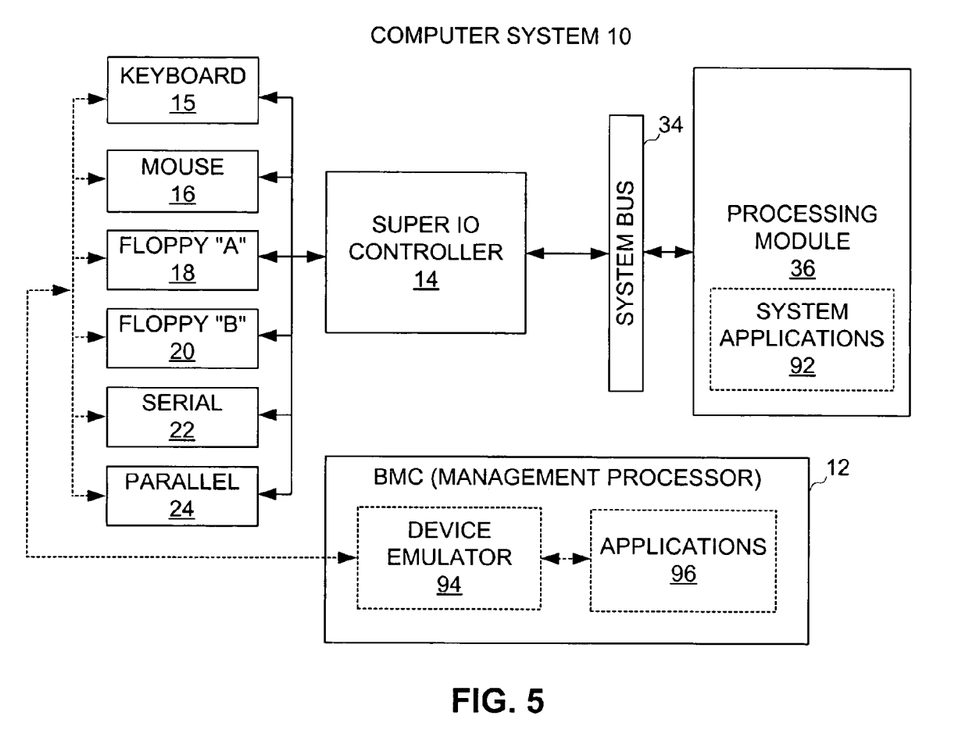
FIG. 5 is a functional diagram depicting how programs operating within a host computer system may address communications and operations to the management processor within an embodiment of the invention.

FIG. 5 is a functional diagram depicting how programs operating within computer system 10 may address communications and operations to a management processor, such as BMC 12. Communications to BMC 12 occur through interfaces within super IO controller 14. These interfaces include those of keyboard 14, mouse 16, floppy "A" FDD 18, floppy "B" FDD 20, serial port interface 22, parallel port interface 24 and other like interfaces. These interfaces operably couple to BMC 12 through connections such as GPIO 42, depicted in FIG. 2. As these interfaces are inherent within the architecture of the super IO controller 14, communications between the management processor and computer system 10 are possible by emulating the appropriate signals for the super IO controller 14. For example, the server platform may communicate with the BMC through an emulated IO port, such as a UART serial port. These communications may take the form of commands issued from the server platform to the BMC.

A device emulator 94 may be stored and executed by the management processor. The device emulator 94 controls the operation of an emulated device or port. Thus, device emulator 94 may mimic the operation of any of the various peripherals and devices that may interface with computer system 10 through super IO controller 14. This allows programs or peripherals to interface with the management processor without the need for specific device drivers.

In one embodiment, programs executed on the host computer system 10 may configure the management processor by issuing commands, presumably a configuration script, over a virtual serial port. This allows configuration without requiring a PCI device driver. Other imbedded baseboard management controllers or processors (IOP) may require a method for automated configuration rollup that does not require networking activity or user intervention or device drivers.

These implementations do not require either a network interface or an interface with an embedded processor using a device driver. Typically, a network interface or an interface using a device driver requires substantial software to communicate to the management processor. This software must be developed, maintained, and supported throughout a variety of hardware and software environments.

Although the present invention is described in detail, it should be understood that various changes, substitutions and alterations can be made hereto without departing from the spirit and scope of the invention as described by the appended claims.

What is claimed is:

1. A method to provide server management information comprising:
    emulating a mass storage device (MSD) using firmware on a baseboard management controller (BMC);
    coupling the emulated MSD to MSD signal connections on an Input/Output (I/O) controller connected to a main processing module;
    acquiring server management data from sensors coupled to the BMC and storing them on the emulated MSD; and
    the main processing module reading the server management data from the emulated MSD, through the Input/Output controller.

2. The method of claim 1, wherein the MSD is selected from the group consisting of:
    a floppy disk drive (FDD);
    a hard disk drive (HDD), comprising an integrated drive electronics (IDE) or enhanced IDE (EIDE) HDD;
    a universal serial bus (USB) MSD; and
    an optical disk drive.

3. The method of claim 2, wherein emulating the MSD further comprises electrically coupling a MSD interface on the I/O controller to General Purpose Input/Output (GPIO) pins on the BMC that emulates the MSD.

4. The method of claim 1, wherein emulating the MSD further comprises providing a plurality of signals from the emulated MSD to a FDD interface on the I/O controller.

5. The method of claim 1, wherein the server management data comprises fan, temperature, ECC memory, errors, storage subsystem statistics, firmware revisions, and/or unit ID information.

6. The method of claim 1, further comprising representing the server management data within a virtual file allocation table (FAT) file system on the emulated MSD.

7. The method of claim 6, wherein the server management data is written to Extensible Markup Language (XML) data files on the emulated MSD.

8. A server with access to server management data through an emulated floppy disk drive (FDD), wherein the server comprises:
    a processing module having at least one processor;
    a baseboard management controller (BMC) with firmware that emulates the FDD;
    sensors coupled to the BMC to sample server management data, and provide the data to the BMC for storing in the emulated FDD; and
    an Input/Output (I/O) controller connected to the processing module comprising:
    a FDD interface coupled to the BMC; and
    a FDD controller;
    wherein the processing module reads the server management data acquired by the sensors from the emulated FDD through the Input/Output controller and the BMC through the FDD interface and the FDD controller.

9. The server of claim 8, wherein the BMC further comprises General Purpose Input/Output (GPIO) pins to electrically couple to the FDD interface of the Input/Output controller.

10. The server of claim 8, wherein the BMC provides a plurality of signals to the FDD interface.

11. The server of claim 8, wherein the emulated FDD is a floppy "B" drive.

12. The server of claim 8, wherein the server management data comprises fan tachometer outputs, temperature sensor outputs, ECC memory errors, storage subsystem statistics, firmware revisions, and/or unit ID information.

13. The server of claim 8, wherein server management data is represented within a virtual file allocation table (FAT) file system on the emulated FDD.

14. The server of claim 13, wherein the server management data is written to Extensible Markup Language (XML) data files on the emulated FDD.

15. A method to communicate server management information to a server comprising:
    emulating a floppy disk drive (FDD) on a baseboard management controller (BMC);
    coupling the BMC to an Input/Output (I/O) controller having a FDD controller, whereby the emulated FDD is coupled to the FDD controller;
    connecting the Input/Output (I/O) controller to a processing module of the server;
    gathering server management data from hardware sensors coupled to the BMC;
    writing the server management data to data files within the emulated FDD; and
    the server reading the server management data from the emulated FDD through the Input/Output (I/O) controller.

* * * * *

UNITED STATES PATENT AND TRADEMARK OFFICE
CERTIFICATE OF CORRECTION

PATENT NO. : 7,590,522 B2  Page 1 of 1
APPLICATION NO. : 10/867524
DATED : September 15, 2009
INVENTOR(S) : Peter A. Hansen et al.

It is certified that error appears in the above-identified patent and that said Letters Patent is hereby corrected as shown below:

In column 9, line 44, in Claim 5, delete "memory," and insert -- memory --, therefor.

Signed and Sealed this

Second Day of November, 2010

David J. Kappos
*Director of the United States Patent and Trademark Office*